US009479979B2

(12) United States Patent
Drury et al.

(10) Patent No.: US 9,479,979 B2
(45) Date of Patent: Oct. 25, 2016

(54) SUCCESS RATE IMPROVEMENTS FOR ANR MEASUREMENTS WHILE REDUCING DATA LOSS AT A UE

(75) Inventors: Eric Drury, Lake Zurich, IL (US); Amit Malik, Palatine, IL (US); Shreesha Ramanna, Vernon Hills, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/537,756

(22) Filed: Jun. 29, 2012

(65) Prior Publication Data

US 2014/0004859 A1 Jan. 2, 2014

(51) Int. Cl.
*H04W 36/00* (2009.01)
(52) U.S. Cl.
CPC ................................ *H04W 36/0083* (2013.01)
(58) Field of Classification Search
CPC ............... H04W 24/02; H04W 24/10; H04W 36/0083; H04W 36/08; H04W 36/24; H04W 36/0088; H04W 36/0094
USPC .......................... 455/517, 423, 437; 370/252
See application file for complete search history.

(56) References Cited

U.S. PATENT DOCUMENTS

| 2006/0059556 | A1* | 3/2006 | Royer | G06F 9/485 726/22 |
| 2006/0128394 | A1* | 6/2006 | Turina et al. | 455/453 |
| 2007/0176760 | A1* | 8/2007 | Reeves | G08B 21/04 340/426.22 |
| 2009/0059958 | A1* | 3/2009 | Nakata | H04L 69/14 370/474 |
| 2010/0234027 | A1* | 9/2010 | Han | H04W 36/0083 455/436 |
| 2011/0249642 | A1* | 10/2011 | Song | H04W 28/16 370/329 |
| 2011/0292874 | A1 | 12/2011 | Ho et al. | 370/328 |
| 2012/0252487 | A1* | 10/2012 | Siomina | H04W 24/10 455/456.1 |
| 2012/0275315 | A1* | 11/2012 | Schlangen | H04W 24/02 370/242 |
| 2012/0275364 | A1* | 11/2012 | Anderson | H04W 52/0219 370/311 |
| 2013/0242736 | A1* | 9/2013 | Tarraf | H04W 24/02 370/235 |

OTHER PUBLICATIONS

"3$^{rd}$ Generation Partnership Project; Technical Specification Group Services and System Aspects; Telecommunication management; Automatic Neighbour Relation (ANR) management; Concepts and requirements (Release 11)", 3GPP TS 32.511 V11.1.0, Sep. 2011, 13 pgs.
"3$^{rd}$ Generation Partnership Project; Technical Specification Group Services and System Aspects; Telecommunication management; Self-configuration of network elements; Concepts and requirements (Release 10)", 3GPP TS 32.501 V10.0.0, Mar. 2011, 17 pgs.

* cited by examiner

*Primary Examiner* — Joseph Dean, Jr.
(74) *Attorney, Agent, or Firm* — Harrington & Smith

(57) ABSTRACT

A method is disclosed that includes selecting at an apparatus a user equipment for an automatic neighbor relations measurement based on a determination one or more parameters associated with the user equipment meet one or more scenarios. The method includes initiating by the apparatus an automatic neighbor relations measurement procedure for the selected user equipment. The method includes awaiting at the apparatus for a conclusion of the initiated automatic neighbor relations measurement procedure. Apparatus and program products are also disclosed.

19 Claims, 6 Drawing Sheets

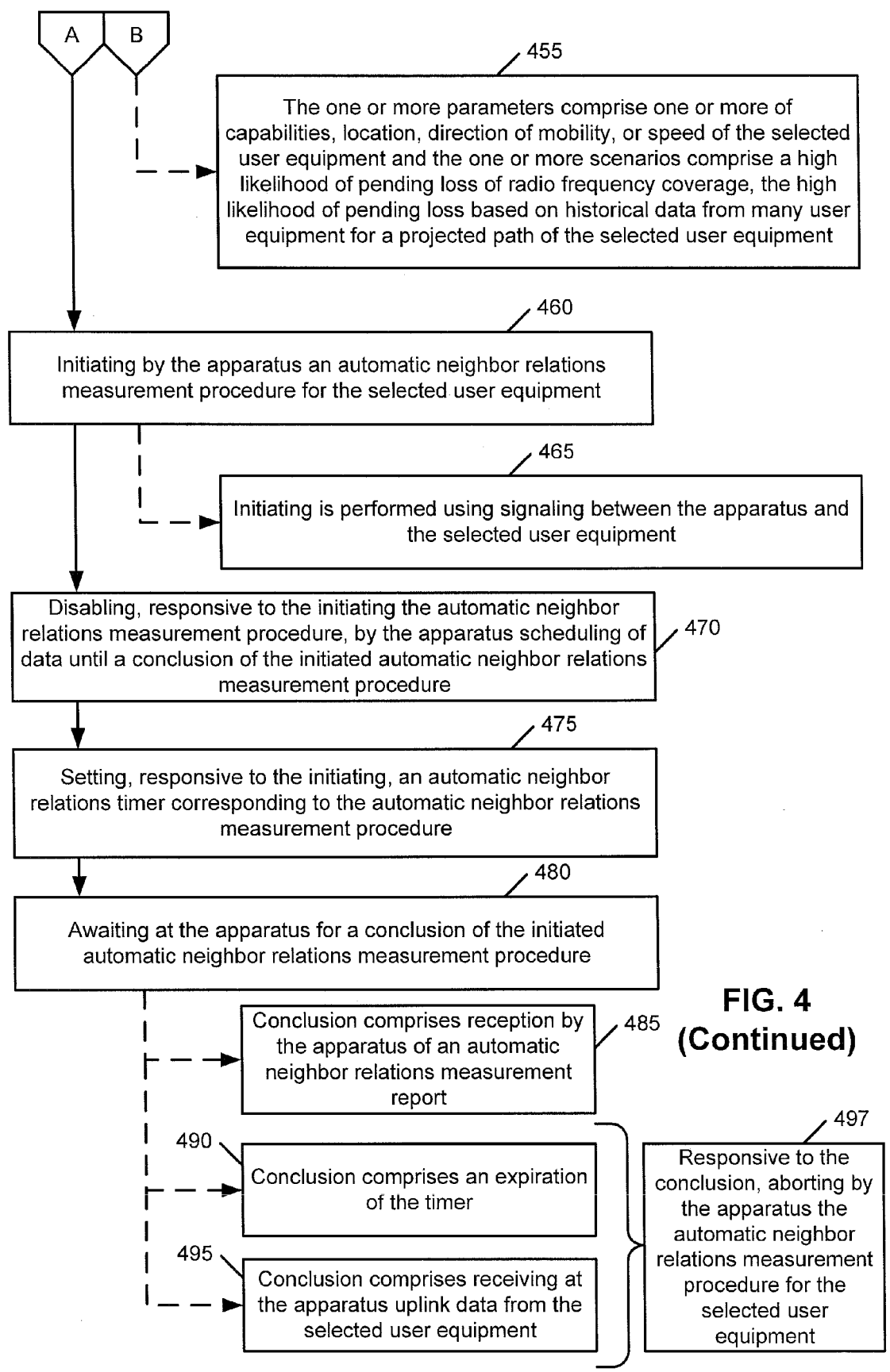

SUCCESS RATE IMPROVEMENTS FOR ANR MEASUREMENTS WHILE REDUCING DATA LOSS AT A UE

TECHNICAL FIELD

This invention relates generally to wireless networks and, more specifically, relates to Automatic Neighbor Relations (ANR) measurements in cellular networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

3GPP Third Generation Partnership Project
ANR Automatic Neighbor Relations
DL DownLink (from base station to user equipment)
DRX Discontinuous Reception
eNB or eNode B evolved Node B (LTE base station)
GBR Guaranteed Bit Rate
HetNet Heterogeneous Network
ISM Industrial, Scientific and Medical
LTE Long Term Evolution
MME Mobility Management Entity
NCE Network Control Element
QoS Quality of Service
RAT Radio Access Technology
RF Radio Frequency
Rx Receiver or reception
TS Technical Standard
Tx Transmitter or transmission
SGW Serving GateWay
SON Self-Organizing Network
UE User Equipment
UL UpLink Current 3GPP standards define Automatic Neighbor Relations (ANR), which allows the eNB to configure a UE to retrieve information from a neighbor cell in order to configure a handover relation to that neighbor cell.

When a UE is configured to perform such measurements, the UE must go off channel on the current serving cell, resulting in a potential disruption of uplink/downlink data to the UE. This can result in QoS characteristics of the bearers established at the UE to not be met. Further, it can take over 2000 msecs (milliseconds) to retrieve neighbor cell information from an inter-RAT neighbor cell, whereas the longest packet delay budget for best effort service is only 300 msecs. The UE will be put into Discontinuous Reception (DRX) in order to give the UE enough time to obtain the information from the neighboring cell. However, if the UE has data to send, the UE can immediately send the data, causing the neighbor cell information retrieval to fail.

SUMMARY

This section contains examples of possible implementations and is not meant to be limiting.

In one example, a method is disclosed that includes selecting at an apparatus a user equipment for an automatic neighbor relations measurement based on a determination one or more parameters associated with the user equipment meet one or more scenarios; initiating by the apparatus an automatic neighbor relations measurement procedure for the selected user equipment; and awaiting at the apparatus for a conclusion of the initiated automatic neighbor relations measurement procedure.

In another example, an apparatus is disclosed that includes means for selecting at an apparatus a user equipment for an automatic neighbor relations measurement based on a determination one or more parameters associated with the user equipment meet one or more scenarios; means for initiating by the apparatus an automatic neighbor relations measurement procedure for the selected user equipment; and means for awaiting at the apparatus for a conclusion of the initiated automatic neighbor relations measurement procedure.

In a further exemplary embodiment, a computer program product is disclosed that includes a computer-readable storage medium bearing computer program code embodied therein for use with an apparatus. The computer program code includes code for selecting at an apparatus a user equipment for an automatic neighbor relations measurement based on a determination one or more parameters associated with the user equipment meet one or more scenarios; code for initiating by the apparatus an automatic neighbor relations measurement procedure for the selected user equipment; and code for awaiting at the apparatus for a conclusion of the initiated automatic neighbor relations measurement procedure.

A further exemplary embodiment is an apparatus including one or more processors and one or more memories including computer program code. The one or more memories and the computer program code are configured, with the one or more processors, to cause the apparatus to perform: selecting at an apparatus a user equipment for an automatic neighbor relations measurement based on a determination one or more parameters associated with the user equipment meet one or more scenarios; initiating by the apparatus an automatic neighbor relations measurement procedure for the selected user equipment; and awaiting at the apparatus for a conclusion of the initiated automatic neighbor relations measurement procedure.

DETAILED DESCRIPTION OF THE DRAWINGS

Figure 1:
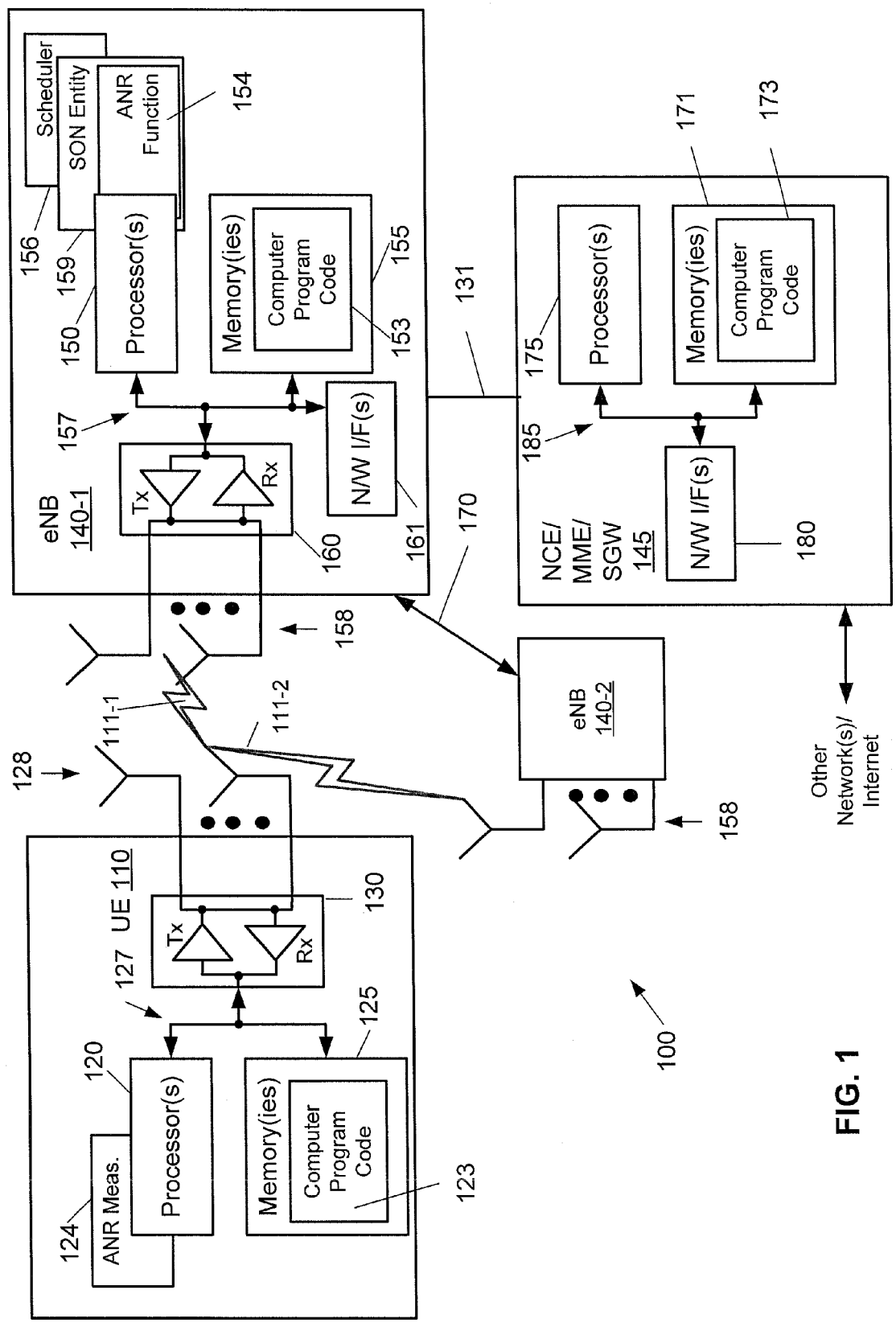
FIG. 1 is a block diagram of an exemplary system in which the exemplary embodiments may be practiced.

Before proceeding with additional description regarding ANR measurements, problems with the ANR measurements, and exemplary embodiments that address those problems, reference is made to FIG. 1, which is a block diagram of an exemplary system in which the exemplary embodiments may be practiced. In FIG. 1, a UE 110 may be in wireless communication with a wireless network 100 via corresponding wireless links 111-1 or 111-2. Although only one UE is shown, typically there could be multiple UEs able to connect to the eNBs 140-1, 140-2. Although there are only two eNBs 140-1 and 140-2 shown, there could be multiple eNBs 140. Furthermore, the eNBs could form cell(s) having coverage areas (not shown in FIG. 1) that partially overlap (e.g., two macro eNBs that are neighbors) or that fully overlap (e.g., one eNB is a macro eNB and the other eNB is a pico eNB).

The user equipment 110 includes one or more processors 120, one or more memories 125, and one or more transceivers 130 interconnected through one or more buses 127. The one or more transceivers 130 (each comprising a receiver, Rx, and a transmitter, Tx) are connected to one or more antennas 128. The one or more memories 125 include computer program code 123. The ANR measurement (Meas.) module 124 performs the ANR measurements and associated operations as described herein. The ANR measurement module 124 may be implemented in hardware, e.g., as logic in the one or more processors 120, or in software (e.g., in computer program code 123 as executed by the one or more processors 120), or by both hardware and software. Thus, in an exemplary embodiment, the one or more memories 125 and the computer program code 123 are configured, with the one or more processors 120, to cause the corresponding user equipment 110 to perform one or more of the operations as described herein. The UE 110 communicates with eNB 140-1 via a corresponding link 111-1 and communicates with eNB 140-2 via a corresponding link 111-2.

The eNB 140-1 and 140-2 are base stations that provide access to the wireless network 100 and each includes one or more processors 150, one or more memories 155, one or more network interfaces (N/W I/F(s)) 161, and one or more transceivers 160 (each comprising an Rx and a Tx) interconnected through one or more buses 157. The one or more transceivers 160 are connected to one or more antennas 158. The one or more memories 155 include computer program code 153. The ANR function 154 performs one or more of the operations related to ANR described herein. This example concerns distributed SON, so each eNB 140 has a SON entity 159, of which the ANR function 154 forms a part in this example. The eNB 140-1 also includes in this example a scheduler 156 that, e.g., schedules certain operations for the UE 110 and performs other exemplary operations as described herein. The ANR function 154 and the scheduler 156 may be implemented in hardware, e.g., as logic in the one or more processors 150, or in software (e.g., in computer program code 153 as executed by the one or more processors 150), or by both hardware and software. Consequently, in an exemplary embodiment, the one or more memories 155 and the computer program code 153 are configured to, with the one or more processors 150, cause the corresponding eNB 140 to perform one or more of the operations as described herein. The one or more network interfaces 161 communicate over a network such as the networks 170 and 131. Two or more eNBs 140 communicate using, e.g., network 170. The network 170 may be wired or wireless or both and may implement, e.g., an X2 interface.

The wireless network 100 may include a network control element (NCE) 145 that may include MME/SGW functionality, and which provides connectivity with a further network, such as a telephone network and/or a data communications network (e.g., the Internet). The eNB 140-1 is coupled via a network 131 to the NCE 145. Although not shown, the eNB 140-2 may also connect to the network 131. The network 131 may be implemented as, e.g., an S1 interface. The NCE 145 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 145 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
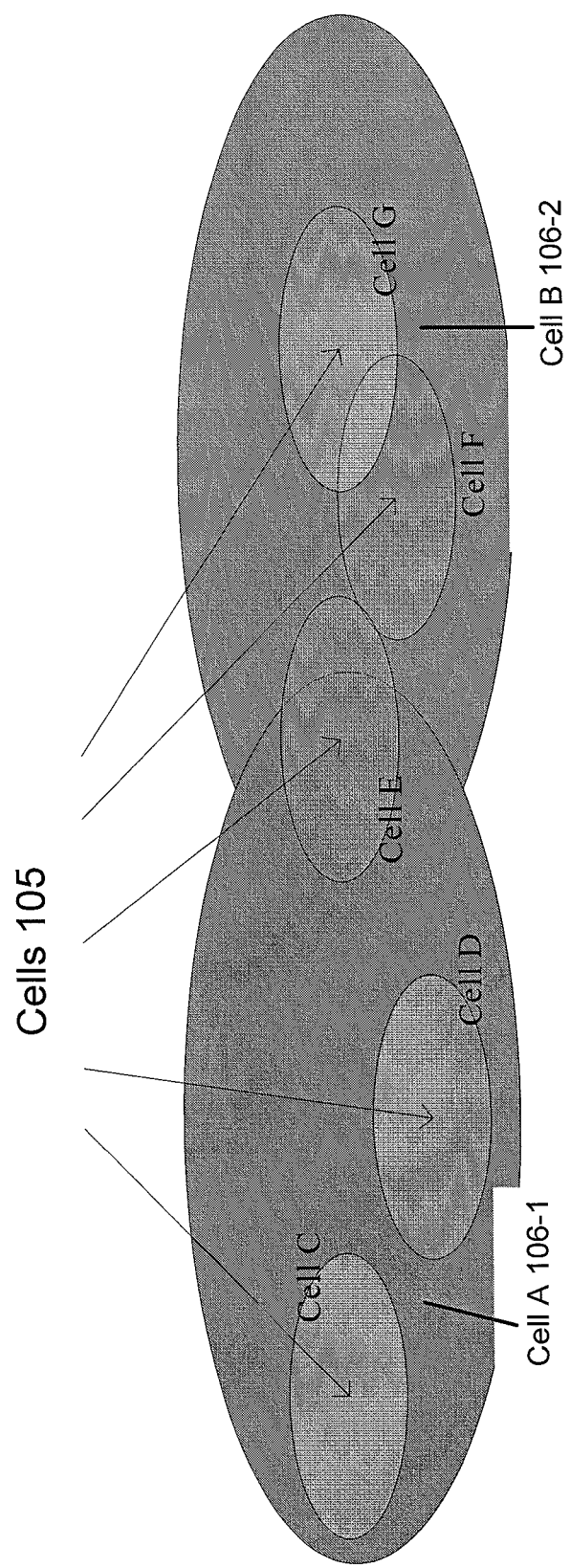
FIG. 2 is an example showing two coverage cells A and B and multiple capacity booster cells.

Turning to FIG. 2, an example is shown of two coverage cells A 106-1 and B 106-2 and multiple capacity booster cells 105. It is noted that this example also shows coverage areas of the cells 105/106. The coverage cells may also be called macro or candidate cells, and the capacity booster cells may be called original cells or may go by a number of names (e.g., micro, pico, femto cells). The capacity booster cells 105 have coverage areas that underlie the (overlying) coverage areas of the coverage cells 106. The cells 106/105 may be formed by the eNBs 140. It is noted that the description herein indicates that "cells" perform functions, but it should be clear that the eNB that forms the cell will perform the functions. By way of further introduction, a cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers (e.g., as part of multiple RATs). So if there are three 120 degree cells per carrier and two carriers, then the eNB has a total of 6 cells.

As stated above, there are problems with ANR measurements. In particular, the 3GPP standards (e.g., 3GPP TS 32.501 and TS 32.511) do not discuss when to configure the UE for ANR measurements. The instant exemplary embodiments address the problems. An exemplary embodiment of the instant invention, for instance, is a method of choosing "optimal" conditions and scenarios in which to configure a UE for an ANR measurement which provide the greatest opportunity for the ANR measurement to be successful without impacting the end user. UEs may be selected based on one or more of the following non-limiting and exemplary factors:

1) The data activity of the UE (i.e., how long the UE has been inactive?);

2) The average inter-packet arrival rate for data sessions with the UE;

3) The service type of the UE (i.e., is the UE using services which require frequent connection setups, or is the UE using any time-sensitive services which could not tolerate the data gap which would be incurred due to an ANR measurement?); and/or 4) The location and projected path of the UE (i.e., is there is a high likelihood of pending loss of RF coverage, such that the UE is a preferred candidate for an ANR measurement to discover cells to fill a coverage hole?).

When the UE is selected for an ANR measurement, the system (e.g., an eNB 140) then performs the following functions in an exemplary embodiment:

A) Suspends an inactivity timer corresponding to the selected UE, i.e., so that the UE is not dropped from connection with the eNB while the ANR measurement is being performed by the UE; and B) Minimizes/defers the scheduling of data to the selected UE in order to maximize the amount of time for the UE to complete the ANR measurement without interruption.

In exemplary embodiments, UEs are not selected for ANR measurements based solely on their ability to perform the measurement, but rather on a likelihood that the measurement will be successful without impacting the end user experience (where the end user is the user of the UE). With exemplary embodiments of the instant invention, reduction of packet loss would be achieved (e.g., a UE typically would not be configured for an ANR measurement when uplink/downlink packets were actively being transferred). UEs configured with GBR bearers may also be eligible to be configured with an ANR measurement. This increases the opportunities for discovering unknown or new neighbors. That is, because all UEs which have GBR bearers are not immediately excluded from ANR measurements, but rather could still be selected based on the conditions mentioned above in (1)-(4), there are potentially more UEs which can be selected to perform ANR measurements.

Exemplary embodiments herein allow a cell's neighbor list to be more dynamically adapted to the changing neighbor topology as more UEs are eligible to discover the neighbor cells. This is especially important in a HetNet (Heterogeneous Network) environment (such as shown in FIG. 2), where cells may be taken in and out of service for power savings (i.e., the footprint of a cell is highly dynamic).

Figure 3:
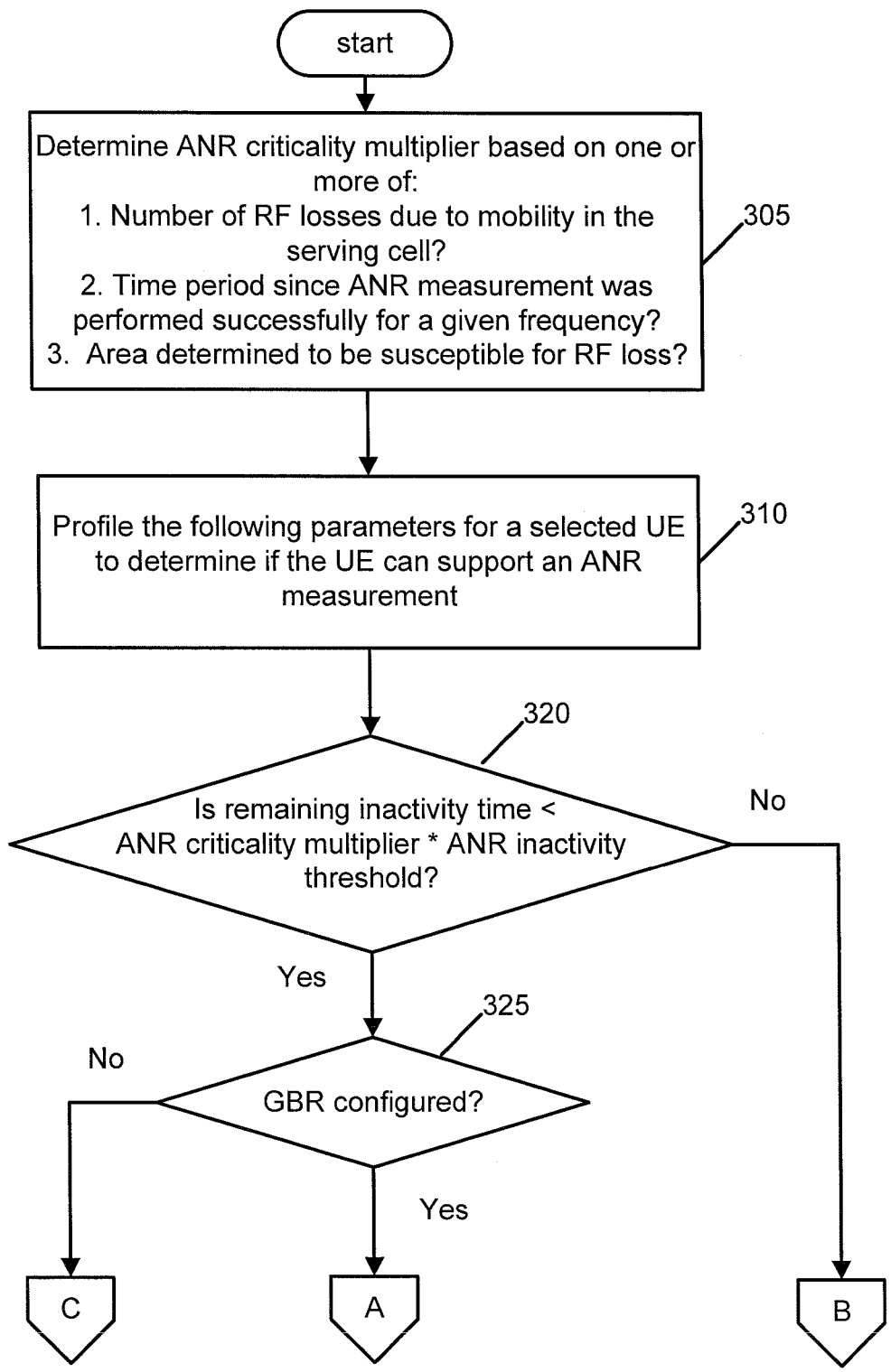
FIG. 3 is a flowchart of exemplary operations performed by an apparatus (e.g., an eNB) to cause success rate improvements for ANR measurements while reducing data loss at a UE.
Figure 3:
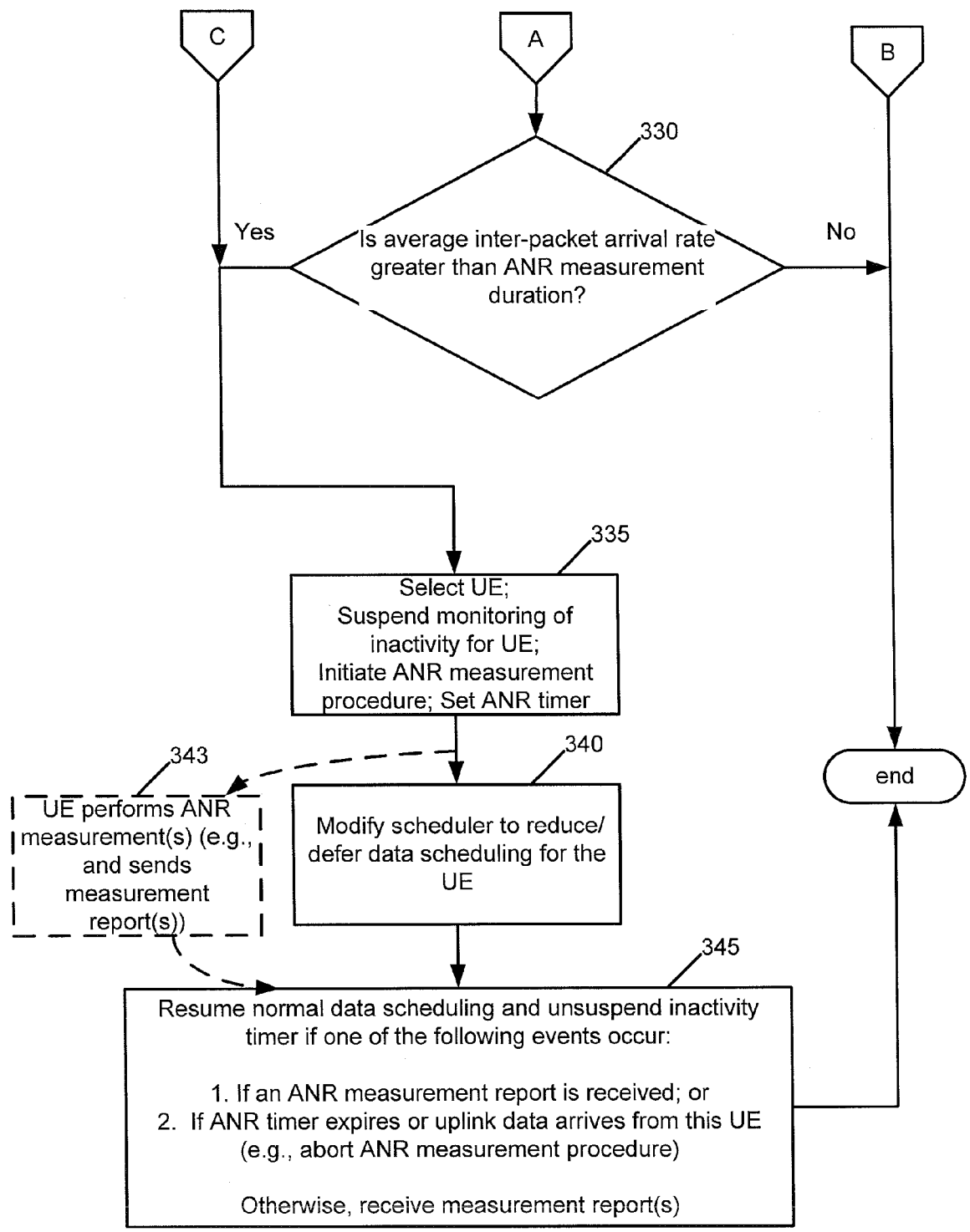

Turning now to FIG. 3, a flowchart is shown of operations performed by an apparatus (e.g., an eNB) to cause success rate improvements for ANR measurements while reducing data loss at a UE. FIG. 3 is merely one exemplary set of operations. Other operations are also described below. The operations in the blocks of FIG. 3 may be operations performed by logic in hardware (e.g., in one or more processors 150), operations performed by the apparatus under control of a computer readable medium, method steps, and/or operations performed by the apparatus under control of the one or more processors 150 (in response to execution of the computer program code 153). In an example, the ANR function 154 of the eNB 140 performs the operations in FIG. 3. Thus, in an exemplary embodiment, these operations can be performed independently by each eNB 140 in the network 100.

The flow starts in block 305, where the apparatus determines an ANR criticality multiplier based on one or more of the following non-limiting examples:

1. Number of RF losses due to mobility (e.g., radio link failure) in the serving cell?

2. Time period since ANR measurement was performed successfully for a given frequency?

3. Area determined to be susceptible for RF loss?

The ANR criticality measure is a measure of how important it is to measure ANR. That is, it is more important to measure ANR (1) as the number of RF losses increase due to mobility in the serving cell; (2) as the time since an ANR measurement was performed successfully increases for a given frequency; and (3) in an area determined to be susceptible for RF loss (e.g., where the area is as determined by location/direction of previous UEs that have an RF loss, and wherein the susceptibility to RF loss is determined (e.g., using information from a number of UEs having RF loss in the area, either detected by the eNB or reported by the UE on a subsequent access).

As an example of how the ANR criticality measure may be determined, consider the following:

$$\text{ANR Criticality Multiplier} = 1 + (RLF - RLFThresh)*W\_RLF + (TANR - TANRThresh)*W\_TANR + (W\_DistRLF)/AVE(DistRLF),$$

Where:

RLF=Number of Radio Link Failures in the cell in a given time period;

RLFThresh=Number of RLFs in a given time period above which more aggressive ANR measurements are required;

W_RLF=Weighting factor for RLFs in cell;

TANR=Time since a ANR measurement was performed for a given frequency/technology;

TANRThresh=Period at which more aggressive ANR measurements are required;

W_TANR=Weighting factor for period between ANR measurements for frequency/technology;

W_DistRLF=Weighting factor for distance of UE from a reported RLF in the cell; and DistRLF=Distance of UE from a reported RLF.

In block 310, the parameters in block 320 are profiled for a selected UE to determine if the UE can support an ANR measurement. In block 320, it is determined if the remaining inactivity time is less than ("<") the ANR criticality multiplier multiplied by ("*") an ANR inactivity threshold. The remaining inactivity time is, e.g., a remaining portion of inactivity time defined by an inactivity timer corresponding to the UE. That is, the UE has an inactivity time period during which the UE is inactive. Block 320 attempts to determine a likelihood that the ANR measurement will be successful without impacting the end user (e.g., by using the remaining inactivity time period), balanced against a determined importance of having an ANR measurement taken (e.g., such importance determined using the ANR criticality multiplier and the ANR activity threshold). That is, this example provides a willingness to settle for a smaller remaining inactivity time period if it is more critical an ANR measurement be taken. Illustratively, the ANR inactivity threshold could be two seconds and the ANR Criticality factor could be 1.1, in which case this would increase the chances of the UE being selected. If it is determined the remaining inactivity time is not less than the ANR criticality multiplier multiplied by the ANR inactivity threshold (block 320=No), the method ends. On the other hand, if it is determined the remaining inactivity time is less than the ANR criticality multiplier multiplied by the ANR inactivity threshold (block 320=Yes), block 325 is performed.

In block 325, it is determined if GBR is configured (e.g., set up) for the UE. If GBR is not configured (block 325=No), operation continues in block 335. Otherwise (if GBR is configured, block 325=Yes), it is determined in block 330 if the average inter-packet arrival rate at the eNB is greater than an ANR measurement duration. The ANR measurement duration is a time period it is estimated the UE will take to perform the ANR measurement. If the average inter-packet arrival rate is not greater than an ANR measurement duration (block 330=No), this means there is a low likelihood of the UE's performing an ANR measurement prior to a packet arrival, and a packet arrival (while the UE performs an ANR measurement) could cause packet loss and therefore could impact the end user experience. Consequently, the flow ends. Otherwise (if the average inter-packet arrival rate is greater than an ANR measurement duration, block 330=Yes), there should be a higher likelihood of the UE's performing an ANR measurement prior to a packet arrival, therefore there is less of a likelihood of impact on the end user experience. The flow therefore proceeds to block 335.

In block 335, the apparatus selects the UE for an ANR measurement, the apparatus suspends monitoring of inactivity for the UE, and the apparatus initiates an ANR procedure for the UE, e.g., by signaling the UE to start an ANR procedure. The apparatus also sets an ANR timer, used, e.g., to ensure the UE does not take too long to perform the ANR measurement(s). In block 340, the apparatus modifies the scheduler (e.g., scheduler 156 shown in FIG. 1) to reduce or defer data scheduling for the UE 110. That is, data is not scheduled to be transmitted (in DL) to the UE for at least a time period of the ANR measurement. It is noted that (as indicated by block 343) the UE 110 performs the ANR measurement(s) (e.g., and sends corresponding measurement report(s)). The UE may also send UL data in block 343 (where the ANR measurement is not performed). In block 345, the apparatus will resume normal data scheduling and unsuspend the inactivity timer for the UE if one of the following events occur: 1) If an ANR measurement report is received; or 2) If the ANR timer expires or uplink data arrives from this UE (e.g., abort ANR procedure). If the ANR timer expires, the UE 110 took too long to make the ANR measurement(s) and send the corresponding reports. If the apparatus receives uplink data from the UE, it is clear that the UE will not perform the ANR measurement(s). In both these situations for (2), the apparatus can abort the ANR measurement procedure, e.g., by signaling the UE to abort the procedure. Otherwise, the apparatus should receive the measurement report(s) sent by the UE 110 to the apparatus. The flow ends after block 345.

Note that the flow is intended to be performed on a per UE basis. That is, selection of another UE may be made and the flow performed again relative to the newly selected UE.

Figure 4:
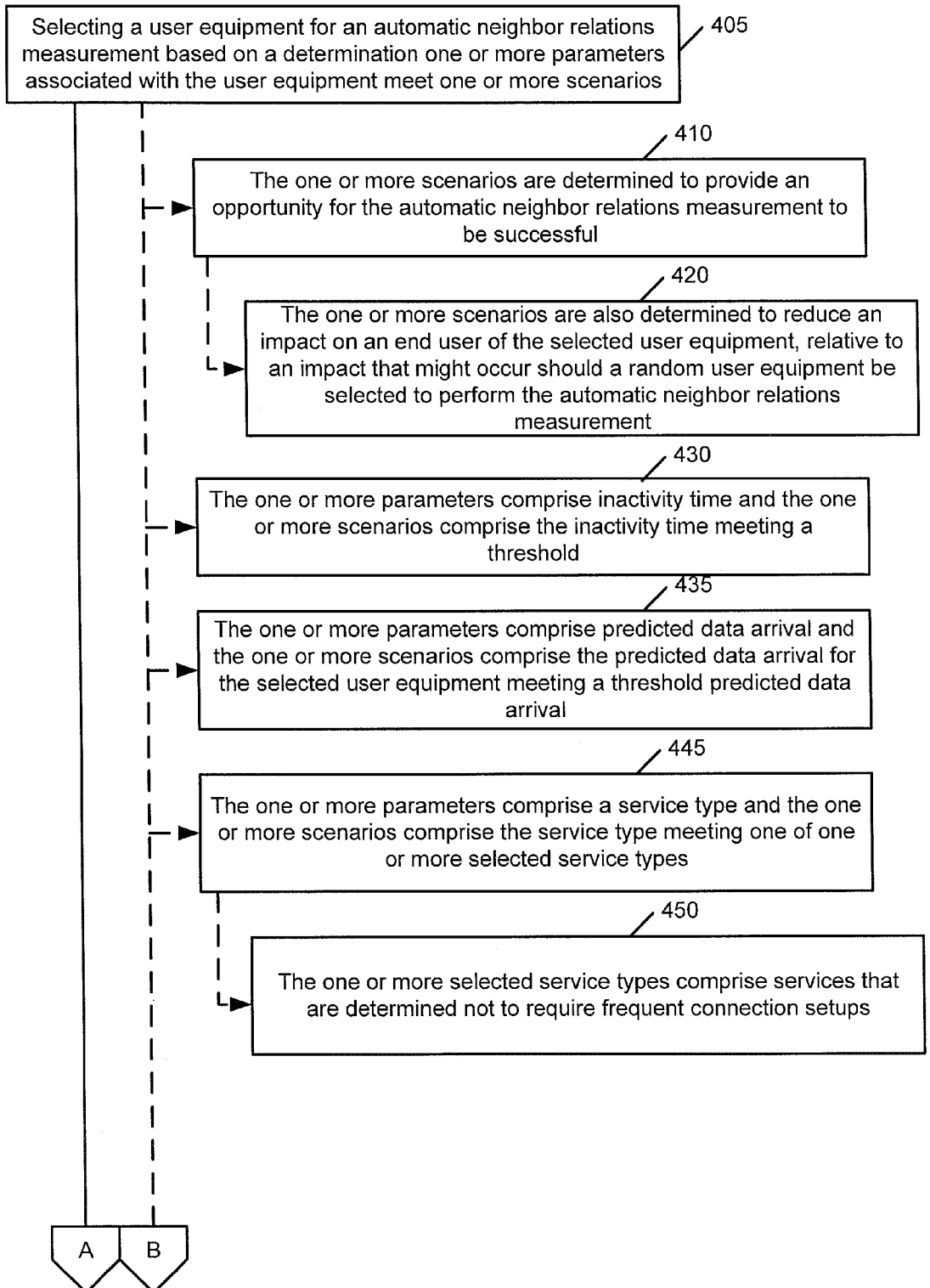
FIG. 4 is another flowchart of exemplary operations performed by an apparatus (e.g., an eNB) to cause success rate improvements for ANR measurements while reducing data loss at a UE.

Turning now to FIG. 4, another flowchart is shown of exemplary operations performed by an apparatus (e.g., an eNB) to cause success rate improvements for ANR measurements while reducing data loss at a UE. The operations in the blocks of FIG. 4 may be operations performed by logic in hardware (e.g., in one or more processors 150), operations performed by the apparatus under control of a computer readable medium, method steps, and/or operations performed by the apparatus under control of the one or more processors 150 (in response to execution of the computer program code 153). In an example, the ANR function 154 of the eNB 140 performs the operations in FIG. 4.

The flow starts in block 405, where the apparatus performs selecting a user equipment for an automatic neighbor relations measurement based on a determination one or more parameters associated with the user equipment meet one or more scenarios. Blocks 410, 430, 435, 440, and 445 provide further exemplary details of block 405. In block 410, the one or more scenarios are determined to provide an opportunity for the automatic neighbor relations measurement to be successful. Block 420 provides additional detail of the example of block 410, where the one or more scenarios are also determined to reduce an impact on an end user of the selected user equipment, relative to an impact that might occur should a random user equipment be selected to perform the automatic neighbor relations measurement. Typically, the scenarios would be chosen to provide no impact on the end user, however, there may be some minor amount of impact. For instance, dropped packets or packet delay for real-time services (e.g., VoIP, Voice over Internet Protocol) would be the potential impact to the UE/user. These impacts are prevented when possible, but provisions may be provided to allow them to occur in order to prevent a more significant impact to the end user experience (e.g., an RLF due to a coverage hole that could be filled via ANR). Examples of blocks 410 and 420 are described throughout this disclosure.

In block 430, the one or more parameters comprise inactivity time and the one or more scenarios comprise the inactivity time meeting a threshold. That is, the UE selection is based on inactivity time of the UE. In an example, a UE selected for ANR measurements is a UE which is about to be released due to data inactivity. This minimizes potential packet loss at the UE and increases the success rate (e.g., likelihood) of the ANR measurements. In another example (as illustrated in block 320 of FIG. 3), the one or more scenarios further comprise the inactivity time meeting a threshold determined using a criticality multiplier multiplied by an inactivity threshold. In a further example, the criticality multiplier is determined as described above in reference to block 305 of FIG. 3.

In block 435, the one or more parameters comprise predicted data arrival and the one or more scenarios comprise the predicted data arrival for the selected user equipment meeting a threshold predicted data arrival. An example of this is illustrated by block 330 of FIG. 3, where a determination is made whether the average inter-packet arrival rate is greater than an ANR measurement duration (e.g., a period of time estimated to be required for the ANR measurement). This minimizes potential packet loss at the HE and increase the success rate of the ANR measurements.

In block 445, the one or more parameters comprise a service type and the one or more scenarios comprise the service type meeting one of one or more selected service types. For instance, as shown in block 450, the one or more selected service types comprise services that are determined not to require frequent connection setups in order for the UE to be selected. That is, in an exemplary embodiment, UEs may be excluded, e.g., even if the UEs meet data inactivity parameters, which are using services which require frequent connection setups (i.e., it is likely that the UE will have data to send during the ANR measurement).

In block 455, the one or more parameters comprise one or more of UE capabilities, location, direction of mobility, or speed of the selected user equipment and the one or more scenarios comprise a high likelihood of pending loss of radio frequency coverage. The UE capabilities may be used to determine if the UE is capable of interfacing with the frequencies/technologies of the known neighbors. If not, there is a higher likelihood of an RLF occurring as there is no neighbor to which the UE may be handed off. Likewise, the UE's capabilities may be used to determine if the UE is capable of performing an ANR measurement for a frequency/technology for which there is currently a coverage hole. The high likelihood of pending loss is based on historical data from many user equipment for a projected path of the selected user equipment. In other words, based on historical data (from many user equipment) for the selected UE's projected path, select the UE for an ANR measurement if there is a high likelihood of pending loss of RF coverage. This attempts to discover neighbors in an area which is susceptible to RF loss. Put another way, if it is determined the UE will likely have a loss of RF coverage (e.g., because a direction of mobility indicates the UE will enter an area having a history of a loss of RF coverage), then the UE can be selected to perform an ANR measurement, which can help to determine if there are any available neighbor cells for handovers of UEs. It is noted there may be a minor impact on the user (e.g., as the UE 110 may experience a delay in reception of data before the UE normally would), but this has the potential benefit of analyzing a coverage hole that could be filled via ANR and corresponding found cell. That is, the UE will not risk an RLF any sooner, but the UE may experience delay in the reception of data (e.g., service interruption) because downlink data is not being scheduled for the UE while the UE is performing the ANR measurement.

In block 460, the apparatus performs initiating an automatic neighbor relations measurement procedure for the selected user equipment. The initiating (as illustrated by block 465) may be performed using signaling between the apparatus and the selected user equipment.

In an exemplary embodiment, the apparatus performs (block 470) disabling, responsive to the initiating of the automatic neighbor relations measurement procedure, scheduling of data (e.g., DL data to the selected UE) until a conclusion of the initiated automatic neighbor relations measurement procedure. See also block 340 of FIG. 3. For instance, the ANR function 154 can inform the scheduler 156 not to schedule DL data to the UE until, e.g., requested by the ANR function 154 to restart DL data scheduling. The ANR function 154 may also use an estimated time period to perform an ANR measurement as a time period provided to the scheduler 156, and the scheduler 156 will not schedule DL data during that time.

In another example, the apparatus performs setting, responsive to the initiating, an automatic neighbor relations timer corresponding to the automatic neighbor relations measurement procedure. This occurs in block 475. The timer is used for block 490. See also block 340 of FIG. 3.

In block 480, the apparatus performs awaiting for a conclusion of the initiated automatic neighbor relations measurement procedure (see also block 345 of FIG. 3). The conclusion could comprise (block 485) reception by the apparatus of an automatic neighbor relations measurement report (see also block 343 of FIG. 3). The conclusion may comprise (block 490) an expiration of the timer set in block 475. The expiration means the ANR measurement took too long. The conclusion could also comprise (block 495) receiving at the apparatus uplink data from the selected user equipment. UL data indicates the user equipment likely will not perform an ANR measurement. For blocks 490 and 495, block 497 may be performed. In block 497, responsive to the conclusion, the apparatus performs aborting by the apparatus the automatic neighbor relations measurement procedure for the selected user equipment. For blocks 490, 495, and 497, see also block 345 of FIG. 3.

Exemplary embodiments of the instant invention may provide one or more of the following non-limiting and exemplary advantages:

1) Embodiments may provide a more robust method of discovering unknown neighboring cells, thereby reducing the potential for RF losses, resulting in improved end user experience.

2) Success of ANR should be improved with the exemplary embodiments, as the disruption time (e.g., the measurement time) of performing ANR can be large as listed below.

Intra Frequency (within the same frequency band): about 200 ms;

Inter Frequency (between different frequency bands): about 200-500 ms; and

Inter RAT: about 2000 ms-2500 ms (CSFB, 1xRTT, single carrier Radio Transmission Technology, and eHRPD, enhanced High Rate Packet Data);

The maximum allowed time is about eight seconds for other technologies.

3) The exemplary embodiments allow unknown neighbors to be discovered while, e.g., minimizing the impact on the end user experience (e.g., no or minimal loss of data to those users which were selected to perform an ANR measurement).

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory 125, 155, 171 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:
1. A method, comprising:
 selecting at an apparatus a user equipment for an automatic neighbor relations measurement based on a determination one or more parameters associated with the user equipment meet one or more scenarios, wherein the one or more parameters comprise inactivity time,
wherein the one or more scenarios comprise a remaining inactivity time, where the remaining inactivity time is less than a threshold, thus minimizing potential impact to an end user experience of the selected user equipment, and
wherein the one or more scenarios are determined to provide an opportunity for the automatic neighbor relations measurement to be successful;
initiating by the apparatus an automatic neighbor relations measurement procedure for the selected user equipment; and
awaiting at the apparatus for a conclusion of the initiated automatic neighbor relations measurement procedure.

2. The method of claim 1, wherein the one or more scenarios further comprise the inactivity time meeting a threshold determined using a criticality multiplier multiplied by an inactivity threshold.

3. The method of claim 2, further comprising determining the criticality multiplier based on one or more of the following:
a number of radio frequency losses due to mobility in the serving cell;
a time period since an automatic neighbor relations measurement was performed successfully for a given frequency; or
an area determined to be susceptible for radio frequency loss.

4. The method of claim 1, wherein the one or more parameters comprise predicted data arrival and wherein the one or more scenarios comprise the predicted data arrival for the selected user equipment meeting a threshold predicted data arrival.

5. The method of claim 4, wherein the one or more scenarios comprise an average inter-packet arrival rate to the selected user equipment being longer than a period of time required for the automatic neighbor relations measurement.

6. The method of claim 1, wherein the one or more parameters comprise a service type and wherein the one or more scenarios comprise the service type meeting one of one or more selected service types.

7. The method of claim 6, wherein the one or more selected service types comprise services that are determined not to require frequent connection setups.

8. The method of claim 1, wherein the one or more parameters comprise one or more of capabilities, location, direction of mobility, or speed of the selected user equipment and wherein the one or more scenarios comprise a high likelihood of pending loss of radio frequency coverage, the high likelihood of pending loss based on historical data from many user equipment for a projected path of the selected user equipment.

9. The method of claim 1, further comprising suspending, responsive to the initiating the automatic neighbor relations measurement procedure, by the apparatus inactivity monitoring until the conclusion of the initiated automatic neighbor relations measurement procedure.

10. The method of claim 1, further comprising disabling, responsive to the initiating the automatic neighbor relations measurement procedure, by the apparatus scheduling of data until the conclusion of the initiated automatic neighbor relations measurement procedure.

11. The method of claim 1, wherein the conclusion of the initiated automatic neighbor relations measurement procedure comprises reception by the apparatus of an automatic neighbor relations measurement report.

12. The method of claim 1, wherein the method further comprises setting, responsive to the initiating, an automatic neighbor relations timer corresponding to the automatic neighbor relations measurement procedure, and wherein the conclusion of the initiated automatic neighbor relations measurement procedure comprises an expiration of the timer.

13. The method of claim 1, wherein the conclusion of the initiated automatic neighbor relations measurement procedure comprises receiving at the apparatus uplink data from the selected user equipment.

14. The method of claim 1, further comprising, responsive to the conclusion, aborting by the apparatus the automatic neighbor relations measurement procedure for the selected user equipment.

15. The method of claim 1, wherein initiating is performed using signaling between the apparatus and the selected user equipment.

16. The method of claim 1, wherein the one or more parameters comprise of at least one of the following:
one or more parameters which determine potential impact a potential impact to an end user experience, and
one or more parameters which determine criticality of discovering a neighbor cell.

17. The method of claim 1, wherein the one or more scenarios are determined to either:
have no impact on the end user of the selected user equipment, or
reduce an impact on an end user of the selected user equipment relative to an impact that might occur should a random user equipment be selected to perform the automatic neighbor relations measurement.

18. A computer program product comprising a non-transitory computer-readable storage medium bearing computer program code embodied therein for use with an apparatus, the computer program code comprising:
code for selecting at an apparatus a user equipment for an automatic neighbor relations measurement based on a determination one or more parameters associated with the user equipment meet one or more scenarios,
wherein the one or more parameters comprise inactivity time,
wherein the one or more scenarios comprise a remaining inactivity time, where the remaining inactivity time is less than a threshold, thus minimizing potential impact to an end user experience of the selected user equipment, and
wherein the one or more scenarios are determined to provide an opportunity for the automatic neighbor relations measurement to be successful;
code for initiating by the apparatus an automatic neighbor relations measurement procedure for the selected user equipment; and
code for awaiting at the apparatus for a conclusion of the initiated automatic neighbor relations measurement procedure.

19. An apparatus, comprising:
one or more processors; and
one or more memories including computer program code, wherein the one or more memories and the computer program code are configured, with the one or more processors, to cause the apparatus to perform or control:
selecting at an apparatus a user equipment for an automatic neighbor relations measurement based on a determination one or more parameters associated with the user equipment meet one or more scenarios, wherein the one or more parameters comprise inactivity time,
wherein the one or more scenarios comprise a remaining inactivity time, where the remaining inactivity time is less than a threshold, thus minimizing potential impact to an end user experience of the selected user equipment,
wherein the one or more scenarios are determined to provide an opportunity for the automatic neighbor relations measurement to be successful;
initiating by the apparatus an automatic neighbor relations measurement procedure for the selected user equipment; and
awaiting at the apparatus for a conclusion of the initiated automatic neighbor relations measurement procedure.

* * * * *